| | | | | |
|---|---|---|---|---|
| | | | | US005922174A |

United States Patent [19]
Youngner

[11] Patent Number: 5,922,174
[45] Date of Patent: *Jul. 13, 1999

[54] DISTILLING APPARATUS

[75] Inventor: Philip G. Youngner, St. Cloud, Minn.

[73] Assignee: Eco-Still Corporation, St. Cloud, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/755,182

[22] Filed: Nov. 25, 1996

[51] Int. Cl.⁶ .............................. B01D 3/10; B01D 3/42
[52] U.S. Cl. .................... 202/186; 202/181; 202/182; 202/202; 202/205; 203/1; 203/87; 159/901; 159/DIG. 16; 159/DIG. 40
[58] Field of Search ..................... 202/186, 202, 202/205, 235, 172, 181, 182; 203/1, 11, 100, 87, 73, 75, 78, 20; 159/DIG. 16, 901, DIG. 40, 44

[56] References Cited

U.S. PATENT DOCUMENTS

| | | | |
|---|---|---|---|
| 3,998,704 | 12/1976 | Follain et al. | 202/160 |
| 4,175,034 | 11/1979 | Thompson | 203/87 |
| 4,261,814 | 4/1981 | Pfeifer | 202/205 |
| 4,269,664 | 5/1981 | Younger | 202/185.2 |
| 4,444,623 | 4/1984 | Youngner | 202/202 |
| 4,554,055 | 11/1985 | Rooney | 202/185.1 |
| 4,762,593 | 8/1988 | Youngner | 202/205 |
| 4,767,502 | 8/1988 | Santasalo et al. | 202/202 |
| 5,211,816 | 5/1993 | Youngner | 202/205 |
| 5,242,548 | 9/1993 | Youngner | 202/202 |

*Primary Examiner*—Virginia Manoharan
*Attorney, Agent, or Firm*—Nawrocki, Rooney & Sivertson, P.A.

[57] ABSTRACT

Distilling equipment including evaporation apparatus having a boiling chamber and equipment and conduits for supplying raw liquid to the boiling chamber, a plurality of cells with the first cell being connected to the top of the boiling chamber to receive gas therefrom and condense the gas by contact with cold recycled distillate from the first cell, with each stage having vertical vacuum producing bubble tubes through which distillate and gas bubbles pass downward to a collection chamber through the bubble tubes. Cell recycle conduits and pumps recycle fluid from collection chamber to condensing chamber. Distillate is drawn from the condensing chamber of the first cell only. Gas by-pass tubes connect the collecting chamber of a cell to the condensing chamber of the next cell and provide the only connection between the cells to sum the vacuum generated by each cell's bubble tubes.

2 Claims, 1 Drawing Sheet

DISTILLING APPARATUS

This application is related to a previous patent of the Applicant, namely U.S. Pat. No. 4,762,593, hereby incorporated by reference.

TECHNICAL FIELD

This invention relates to the field of chemical engineering and particularly to intermediate-scale distilling applications such as for deriving potable water from a source which, because of non-volatile pollutants, is saline or otherwise not potable, for purifying and reclaiming industrial solvents, or for deriving alcohol of tractor-fuel grade as a byproduct of agricultural operations.

BACKGROUND OF THE INVENTION

Vacuum distillation is a well-known process for separating chemical components on the basis of differences in vapor pressure.

Distillation under vacuum has several advantages over distilling at atmospheric or superatmospheric pressures, because of the lower temperatures at which the process can be conducted. Economical low-grade heat sources may be used. Safety is enhanced by the low temperature operation, and thermal degradation of the chemical components is minimized. Furthermore, leaching of impurities from the walls of the apparatus itself is minimized. Some of the best materials of construction, such as polyethylene, cannot be used at the higher temperatures but work well at the temperatures of vacuum distillation.

A vacuum distillation apparatus which works well in areas of limited headroom was patented by Applicant in U.S. Pat. No. 4,444,623 hereby incorporated by reference. A shortcoming of this invention which required the distillate pump was overcome by the vacuum distillation apparatus patented by Applicant in U.S. Pat. No. 4,762,593 incorporated above by reference. A shortcoming of that apparatus is the circulation of fluid from two or more stages in series. This requires precise control of pumps circulating the fluid to ensure that the fluid level in the condensation chambers remains within relatively close limits. If the levels were to fall below the level of tubes extending downward into the chambers the vacuum for that chamber would be bypassed causing operation of the apparatus to cease. This precise control requires relatively sophisticated apparatus such as electronic sensors and flow control valves. Eliminating this pumping requirement and associated apparatus would simplify and improve the apparatus considerably.

SUMMARY OF THE INVENTION

The present invention is an improvement to prior art vacuum distilling apparatus. A system embodying the invention comprises evaporation apparatus and condensation apparatus. The evaporation apparatus evaporates a portion of raw liquid, the liquid to be distilled, and the resulting vapor is cooled and condensed in the condensation apparatus for recovery as distillate.

The evaporation apparatus comprises a generally vertical boiling chamber containing spent liquid with a controlled liquid level. Recycle circulation means includes a pump connected to the bottom of the boiling chamber, having a conduit passing through a heat exchanger introducing heat into the system and a flow control valve to discharge into a sidearm of the boiling chamber. A portion of the spent liquid is withdrawn from the circulation conduit and raw liquid is drawn into the circulation recycle conduit to be heated and injected together with circulated spent liquid into the sidearm.

A connecting conduit directs vapor and/or gases from the boiling chamber to condensation apparatus for cooling and condensation.

The condensation apparatus comprises two or more cells of vacuum generation and cooling of vapor and/or gases and distillate. Vertical bubble tubes in each cell carry a mixture of liquid and vapors and/or gas downward from a condensing chamber in a vacuum producing column terminating in a collection chamber. Each cell has its own circulating pump, its own condensing chamber, its own collection chamber and its own set of bubble tubes extending from the bottom of the condensing chamber to the top of the collection chamber. Each cell also has a recycle conduit with a circulation pump to pump and recycle liquid from the collection chamber to the condensation chamber. A cold side heat exchanger in the conduit of the first cell removes heat from the circulated fluid of the first cell to aid in condensation. A gas carrier tube carries only vapor and/or gases from the top of the collection chamber of one cell to the top of the condensing chamber of the following cell. The only connection between successive cells is this gas carrier tube.

With this arrangement the liquid circulating within cells stays within that cell with only uncondensed gases moving from cell to cell which are discharged to the atmosphere at the collection chamber of the final cell. The number of cells in this apparatus can be any number greater than one. The bubble tubes provide vacuum for the system with the total length of the bubble tubes for all of the cells being approximately 40 feet. Of this bubble tube length, 34 feet of its length provides a water column height equal to one atmosphere, while the additional length provides for frictional losses plus the space occupied by the bubbles in the bubble tubes.

This arrangement circulates the liquid within each cell within that cell only rather than pumping the liquid to later cells as previous apparatus did. The first cell condenses distillate from gasses routed through the connecting conduit from the boiling chamber. The first cell is the only one which collects distillate liquid, and is therefore made larger than later cells. The first cell, in addition to providing all of the distillate collecting function, also contributes its bubble tube length to the system vacuum. To collect the distillate, the first cell has a fluid level sensor operating a positive displacement pump which discharges collected distillate in its collection chamber above a predetermined level into a distillate container. Later cells provide only additional bubble tube length to increase the applied system vacuum. All cells in the condensation apparatus and the evaporation apparatus must be charged with liquid, preferably a pure distillate, prior to operation to provide the necessary vacuum generation when the system operation is initiated.

This arrangement, which isolates the liquid flow of the cells from one another, contrasts with previous apparatus which had liquid flowing through a series of stages. The amount of liquid which had to be pumped in each stage, because of this series flow of liquid the series of stages, had to be an amount which would not upset the liquid height of that stage. This required relatively sophisticated monitoring and control apparatus, such as electronic flow sensors and flow control valves, to meet this requirement. The arrangement of the instant invention, which isolates the fluid flow of each cell, completely eliminates this pumping requirement and all the additional apparatus it requires.

Various advantages and features of novelty which characterize this invention are pointed out with particularity in the claims annexed hereto and forming a part hereof. However, for a better understanding of the invention, its advantages, and objects attained by its use, reference should be made to the drawing which forms a further part hereof, and to the accompanying descriptive matter, which illustrates and describes the preferred embodiment of the invention.

DETAILED DESCRIPTION OF THE INVENTION

Figure 1:
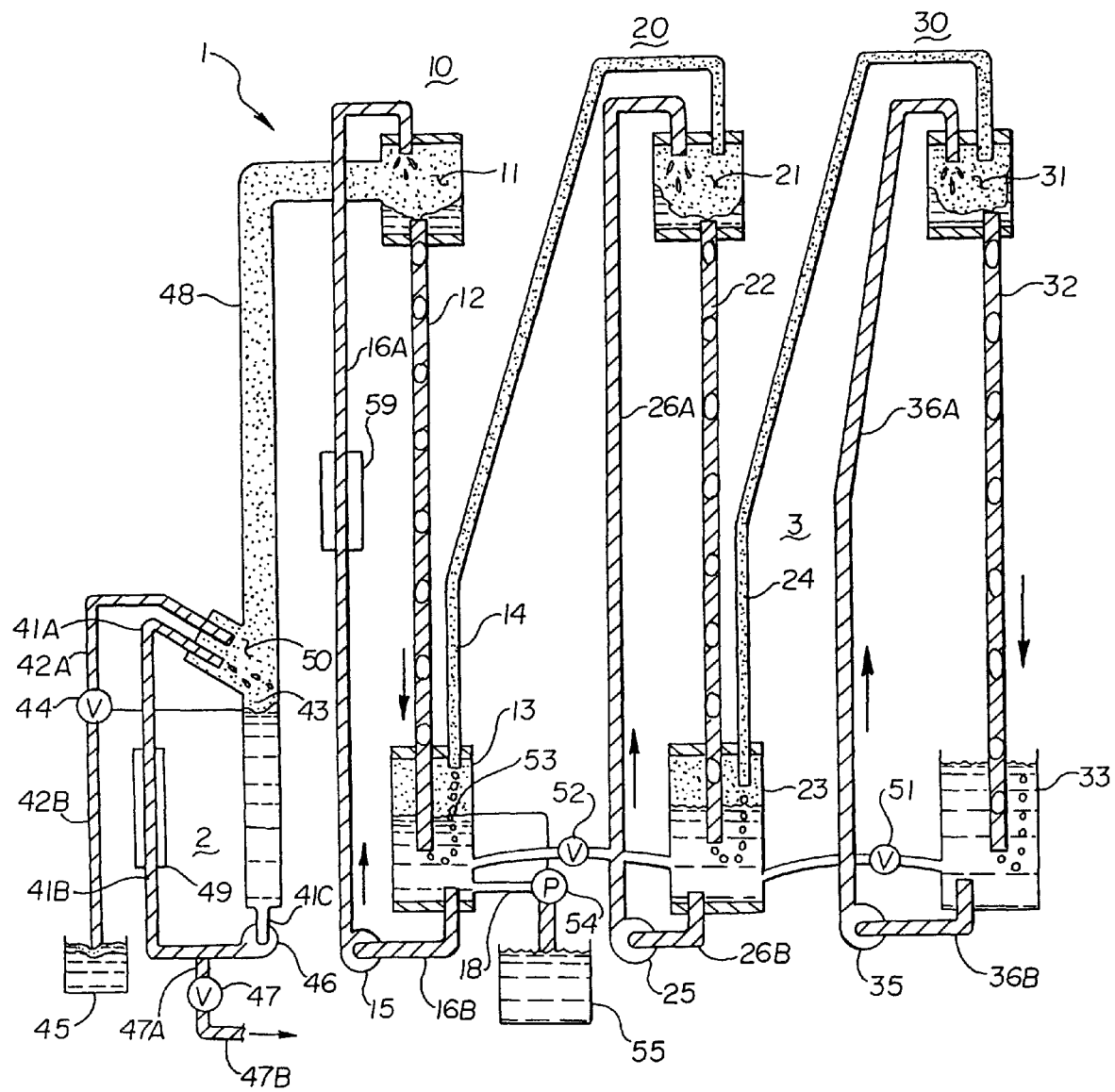
FIG. 1 is a schematic showing a distillation system embodying the invention.

Referring to FIG. 1, a distilling system 1 according to the invention is shown to comprise evaporation apparatus 2 and distillation apparatus 3. The system operation takes raw liquid from raw liquid container 45 into boiling chamber 50 for distillation under reduced pressure. The produced vapors are directed to condensation apparatus 3 from evaporation apparatus 2 through tube 48 for condensation and cooling and a product distillate is delivered from the condensation apparatus 3 to distillate container 55.

The illustrated embodiment shows that evaporation apparatus 2 consists of conduit 41A, 41B, and 41C, conduit 42A and 42B, conduit 47A and 47B, liquid level sensor 43, solenoid valve 44, raw liquid container 45, centrifugal pump 46, positive displacement waste pump 47, tube 48, warm side heat exchanger 49, and boiling chamber 50.

Conduit 42B extends downward into the raw liquid in raw liquid container 45 and upward to solenoid valve 44, and its extension conduit 42A. Conduit 42A, extends from the solenoid valve to boiling chamber 50 through and into tube 48. Liquid level sensor 43 within tube 48 controls solenoid valve 44 to maintain liquid within tube 48 at a preset level. Conduit 41C extends through and into the closed bottom of tube 48 to centrifugal pump 46. Conduit 41B, an extension of conduit 41C, extends from centrifugal pump 46 to conduit 47A and into warm side heat exchanger 49. Conduit 41A, an extension of conduit 41B, extends from warm side heat exchanger 49 through and into tube 48 at boiling chamber 50. Conduit 47A extends from conduit 41B into waste pump 47. Conduit 47B, an extension of conduit 47A, extends downward from waste pump 47 to provide an outside drain.

The illustrated embodiment also shows condensing apparatus 3 having a first cell 10, an intermediate cell 20 and a final cell 30. While condensation apparatus 3 shown here has three cells, there can be any number of cells in this apparatus greater than one. Cells 10, 20 and 30 each have respectively a closed condensation chamber 11, 21 and 31; collection chambers 13, 23, and 33; bubble tubes 12, 22 and 32; centrifugal circulation pumps 15, 25 and 35; recycle conduit 16A and 16B, conduit 26A and 26B, and conduit 36A and 36B.

A gas by-pass tube 14 extends from and into the top of the collection chamber 13 of cell 10 to and into the top of condensation chamber 21 of cell 20, and a gas by-pass tube 24 extends from and into the top of the collection chamber 23 of cell 20 to and into the top of condensation chamber 31 of cell 30.

Condensation chambers 11, 21 and 31 are closed except for the described connecting conduits and/or tubes. Collection chambers 13 and 23 are also closed except for connecting conduits and/or tubes. Collection chamber 33, in addition to the same conduits and/or tubes as the previous chambers, has an upper opening to the atmosphere.

Condensation chamber 11 receives gases and vapors from evaporation apparatus 2 through tube 48. Condensation chamber 21 receives gases and vapors from collection chamber 13 of cell 10 through gas by-pass tube 14, and condensation chamber 31 receives gases and vapors from collection chamber 23 of cell 20 through gas by-pass tube 24. Uncondensed gases from collection chamber 33 of cell 30 are discharged to the atmosphere through the upper opening in the collection chamber.

Condensation chambers 11, 21 and 31 provide a splashing mechanism for liquid pumped by respective pumps 15, 25 and 35 forcing liquid through respective recycle conduits 16A and its extension 16B, 26A and its extension 26B, and 36A and its extension 36B, which exit at the bottom of each respective collection chamber 13, 23 and 33 and enter at the top of each respective condensation chamber to permit the liquid to splash down to the bottom of each chamber. This splashing mechanism creates non-condensed gas bubbles having a diameter which the inner diameter of bubble tubes 12, 22 and 32 must essentially match. These bubbles, because of this match in diameter, create a vacuum as the bubbles move downward through the bubble tubes. Vacuum is created here in the same manner as in the referenced patents. One or a number of bubble tubes in parallel for bubble tubes 12, 22 and 32 can be used between each of the condensation and collection chambers, but the diameter of each individual bubble tube must have the diameter described above.

The series connections of gas by-pass tubes 14 and 24 connecting the cells together results in the vacuum of bubble tubes 12, 22 and 32 being additive with respect to evaporation apparatus 2.

With this arrangement, since cell 10 is connected to cell 20 only by gas by-pass tube 14 and cell 20 is connected to cell 30 only by gas by-pass tube 24, any liquid within collection chambers 13, 23 and 33 will remain in that chamber. Centrifugal pumps 15, 25 and 35 pump fluid from their respective collection chambers 13, 23 and 33 through the respective recycle conduits 16A, 16B, 16C, 26A, 26B, 26C, and 36A, 36B, 36C to respective condensation chambers 11, 21 and 31.

Cold side heat exchanger 59 around recycle conduit 16A, 16B cools the liquid being pumped by pump 15 from collection chamber 13 to condensation chamber 11 to aid in condensation.

Collection chamber 13 of cell 10 has a conduit 18 extending outward near the bottom of the chamber to gear pump 54. A conduit also extends from gear pump 54 to distillate container 55. Fluid level sensor 53 within collection chamber 13 controls gear pump 54 and will cause the pump to discharge fluid above a preset level within the collection chamber into container 55. This provides a means for collecting distillate from collection chamber 13 as it is being condensed.

Solenoid valve 52 controls liquid flow through a conduit extending between and into collection chamber 13 and collection chamber 23. Solenoid valve 51 controls liquid flow through a conduit extending between and into collection chamber 23 and collection chamber 33.

START-UP REQUIREMENTS

Valves 51 and 52 are opened during start-up only and pure water, or any other distillate which is being extracted, is added to collection chamber 33 and allowed to flow from chamber 33 into chamber 23 by open valve 51, and thence from chamber 23 into chamber 13 by open valve 52. When chambers 13 and 23 are filled to approximately half of their capacity then valves 51 and 52 are closed. Thereafter, except for occasional adjustments of the fluid level in the chambers, valves 51 and 52 remain closed. This is because fluids in cells 20 and 30 circulate only and do not leave their respective cells, consequently little or any fluid is lost or gained in collection chambers 23 and 33.

As a further start-up requirement the raw liquid in raw liquid container 45 and the collected distillate in distillate container 55 be adjusted to cover the ends of their respective discharge conduits to seal the system from the atmosphere since otherwise a vacuum could not be generated.

After these operations power is applied to pumps 15, 25 and 35 to pump fluid from the respective collection chambers 13, 23 and 33 to the respective condensation chambers 11, 21 and 31. Power is then supplied to centrifugal pump 46. Pumps 15, 25 and 35 create a high vacuum by circulating bubbles through respective bubble tubes 12, 22 and 32 and finally to the atmosphere through the upper opening in collection chamber 33. After a high vacuum has been created warm side heat exchanger 49 and cold side heat exchanger 59 are energized.

OPERATION

After start-up circulation pumps 15, 25 and 35 pump fluid continuously from respective collection chambers 13, 23 and 33 to respective condensation chambers 11, 21 and 31. Splashing in condensation chambers 11, 21 and 31 causes the fluid moving through respective bubble tubes 12, 22 and 32 to become interspersed with air bubbles. When this fluid reaches collection chambers 13, 23 and 33, these air bubbles are freed from the confines of respective bubble tubes 12, 22 and 32 and rise to the upper sections of the respective collection chambers 13, 23 and 33. The air having free access to gas by-pass tubes 14 and 24 rises up these tubes. This results in gas in cell 10 being transferred to cell 20, and gas in cell 20 being transferred to cell 30. When the gas bubbles reach collection chamber 33 they escape to the atmosphere through its upper opening.

After a short while, as a result of this sequence, all of the gas in condensation chamber 11 and in tube 48 has been transferred to collection chamber 33 and escaped to the atmosphere resulting in a high vacuum of about 29 inches of mercury within the tube. This high vacuum causes some of the fluid, circulated by pump 46, warmed by warm side heat exchanger 49, and injected into boiling chamber 50 in tube 48, to flash into vapor. Liquid that does not flash into vapor continues to be circulated around tube 48 by pump 46.

The vapor in boiling chamber 50 rises up tube 48 where it meets the fluid circulated up recycle conduit 16A and its extension 16B by pump 15 and cooled by cold side heat exchanger 59. This cooled fluid causes the vapor to condense in condensation chamber 11. As this fluid accumulates in collection chamber 13, any excess above the preset level is sensed by fluid level sensor 53, which causes gear pump 54 to pump the excess into distillate container 55 to collect the distillate product.

Positive displacement waste pump 47 can be operated continuously or in an intermittent mode manually to discharge waste fluid through conduits 47A and 47B outside the apparatus. For discharging water that is only moderately saline continuous operation works very well. In this case, waste pump 47 is adjusted to pump waste out at a rate about equal to the production rate. If this is done, then the salinity of the waste water will be about twice the salinity of the raw supply.

As mentioned earlier, there can be any number of cells greater than one used in this apparatus. The positive displacement pumps can be any type of positive displacement pump, and any other type of positive displacement pump can be substituted for a gear pump. If only two cells are used for this apparatus, the first cell will constitute the primary cell and the second cell will constitute the final cell.

An advantage of the present invention as herein described is that the use of gas tubes separate from liquid carrying conduit tubes separates the fluid circulated of each cell. This separation completely eliminates the pumping requirement of previous apparatus having fluid circulating in series through successive stages which required closely monitoring and controlling each fluid pump with an attendant increase in complexity and cost.

The resulting simplification provides an easily operated, notably inexpensive vacuum still for high rate distillation of a variety of raw liquids. The distilling apparatus may be operated unattended over long time periods.

While this invention has been described with respect to a specific embodiment, this description is not intended to be construed in a limiting sense. Various modifications of the illustrative embodiment, as well as other embodiments of the invention, will be apparent to persons skilled in the art upon reference to this description. It is therefore contemplated that the appended claims will cover any such modifications or embodiments as fall within the true scope of the invention.

What is claimed is:

1. A vacuum distilling apparatus comprising in combination:
   a) evaporation apparatus including a boiling chamber, means for supplying raw liquid to said boiling chamber at a predetermined level, and connecting conduit means for directing vapors from said boiling chamber to a primary condensation cell of a condensation apparatus;
   b) said primary condensation cell including a closed primary condensation chamber above said predetermined level and connected to, and being in fluid communication with, said connecting conduit means such that vapors therefrom are received, cooled and condensed, a primary collection chamber below said primary condensation chamber, at least one primary bubble tube connected to a lower portion of said primary condensation chamber and extending downward into said primary collection chamber, for carrying gas bubbles and distillate downward from said primary condensation chamber, primary distillate conduit means extending from a bottom of said primary collection chamber to a collector, said primary collection chamber having level sensing means for indicating liquid level of said distillate, said primary distillate conduit means having a positive displacement pump arranged such as to urge distillate from said primary collection chamber through said primary distillate conduit means to said collector; said level sensing means being arranged such as to operate said positive displacement pump and maintain said distillate at a predetermined level; a primary recycle conduit extending from the bottom of said primary collection chamber to an upper portion of said primary condensation chamber; said primary recycle conduit having a non-positive displacement pump arranged to urge liquid from said primary collection chamber to said primary condensation chamber; and a primary gas carrier tube connecting an upper portion of said primary collection chamber, at a level above lower ends of said at least one primary bubble tube, in fluid communication with a final condensation chamber;

c) a final condensing cell including said final condensation chamber, for receiving said gases from said primary gas carrier tube, at least one final bubble tube and a final collection chamber, said bubble tube being connected between a lower portion of said final condensation chamber and an upper portion of said final collection chamber; a final recycle conduit extending between a lower portion of said final collection chamber to an upper portion of said final condensation chamber; said final recycle conduit having a non-positive displagement pump arranged such as to urge liquid from said final collection chamber to said final condensation chamber;

said final collection chamber having an upper opening to the atmosphere.

2. The vacuum distilling apparatus according to claim 1 with said recycle conduit of said primary cell having heat exchange means for cooling fluid therein.

* * * * *